(12) United States Patent
Sandeep et al.

(10) Patent No.: US 10,713,345 B2
(45) Date of Patent: Jul. 14, 2020

(54) SECURE BIOMETRIC AUTHENTICATION WITH CLIENT-SIDE FEATURE EXTRACTION

(71) Applicant: CA, Inc., Islandia, NY (US)

(72) Inventors: Banisetti Sandeep, Srikakulam (IN); Mohammed Mujeeb Kaladgi, Bangalore (IN); Yashwant Ramkishan Sawant, Parbhani (IN); Ruqiya Nikhat Kaladgi, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 16/289,577

(22) Filed: Feb. 28, 2019

(65) Prior Publication Data

US 2019/0197228 A1 Jun. 27, 2019

Related U.S. Application Data

(63) Continuation of application No. 15/415,217, filed on Jan. 25, 2017, now Pat. No. 10,255,416.

(51) Int. Cl.
*G06F 21/32* (2013.01)
*H04L 29/06* (2006.01)
*H04W 12/06* (2009.01)
*G06K 9/00* (2006.01)
*G09C 1/00* (2006.01)
*H04L 9/32* (2006.01)

(52) U.S. Cl.
CPC ......... *G06F 21/32* (2013.01); *G06K 9/00154* (2013.01); *G06K 9/00892* (2013.01); *G09C 1/00* (2013.01); *H04L 9/3231* (2013.01); *H04L 9/3236* (2013.01); *H04L 63/0428* (2013.01); *H04L 63/0861* (2013.01); *H04L 63/10* (2013.01); *H04W 12/06* (2013.01); *G06K 2009/00953* (2013.01); *H04L 2463/121* (2013.01)

(58) Field of Classification Search
CPC ....................................................... G06F 21/32
See application file for complete search history.

(56) References Cited

U.S. PATENT DOCUMENTS

| | | | | |
|---|---|---|---|---|
| 6,038,315 | A * | 3/2000 | Strait | H04L 9/0662 382/115 |
| 7,007,298 | B1 * | 2/2006 | Shinzaki | G07C 9/37 726/3 |
| 9,111,085 | B1 * | 8/2015 | Darmour | G06F 21/34 |
| 9,418,275 | B2 * | 8/2016 | Endoh | G06K 9/00067 |
| 9,485,098 | B1 * | 11/2016 | Lepeshenkov | H04L 9/3297 |

(Continued)

*Primary Examiner* — Bradley W Holder
(74) *Attorney, Agent, or Firm* — Shook, Hardy & Bacon LLP

(57) ABSTRACT

Provided is a process that includes: receiving, with a first device, a request to authenticate a user; obtaining, with the first device, an unstructured-data authentication input; extracting, with the first computing device, a plurality of features of the unstructured-data authentication input to form a structured-data representation; determining, with the first device, a first instance of a value that deterministically varies; and determining, with the first device, a first encrypted value based on both the structured-data representation and the first instance of the value that deterministically varies; and sending, with the first device, the first encrypted value to a second computing device.

19 Claims, 4 Drawing Sheets

(56) References Cited

U.S. PATENT DOCUMENTS

| | | | |
|---|---|---|---|
| 2004/0158723 A1* | 8/2004 | Root | G06F 21/32 |
| | | | 713/186 |
| 2006/0112278 A1* | 5/2006 | Cohen | G06F 21/121 |
| | | | 713/186 |
| 2006/0123241 A1* | 6/2006 | Martinian | H04L 9/0866 |
| | | | 713/186 |
| 2007/0036400 A1* | 2/2007 | Watanabe | G06K 9/001 |
| | | | 382/124 |
| 2007/0174633 A1* | 7/2007 | Draper | G06K 9/00073 |
| | | | 713/186 |
| 2011/0138176 A1* | 6/2011 | Mansour | H04W 12/06 |
| | | | 713/168 |
| 2012/0159600 A1* | 6/2012 | Takagi | G06F 21/32 |
| | | | 726/7 |
| 2012/0189170 A1* | 7/2012 | Uno | G06K 9/00087 |
| | | | 382/115 |
| 2014/0282945 A1* | 9/2014 | Smith | G06F 21/78 |
| | | | 726/6 |

\* cited by examiner

US 10,713,345 B2

SECURE BIOMETRIC AUTHENTICATION WITH CLIENT-SIDE FEATURE EXTRACTION

CROSS-REFERENCE TO RELATED APPLICATION

The present patent is a continuation of U.S. patent application Ser. No. 15/415,217, filed 25 Jan. 2017, having the same title, the entire contents of which is hereby incorporated by reference.

BACKGROUND

Field

The present disclosure relates generally to computer security and, more specifically, to biometric authentication.

Description of the Related Art

The need to authenticate a user with a computing device arises in a wide variety of different scenarios. For example, many computing applications and online resources selectively provide access to users based on whether those users can provide a username and password by which the user is authenticated as being authorized to access resources associated with the user name. In other examples, users may be authenticated before being given access to physical resources. For instance, a user may be authenticated with a computing device before a package is delivered to the user, before the user is permitted to submit payment from an account associated with the user in order to receive physical goods or services, or before the user is granted access to a physical space, for instance, with an electronic lock. Generally, to authenticate the user, the user provides a signal (e.g., a password, biometric input, answer to a question, or output from an electronic device, like a authentication dongle), and a computing device determines whether the user is authenticated based on that signal.

SUMMARY

The following is a non-exhaustive listing of some aspects of the present techniques. These and other aspects are described in the following disclosure.

Some aspects include a process comprising: receiving, with a first computing device, a request to authenticate a user of the first computing device; obtaining, with the first computing device, an unstructured-data authentication input, the unstructured-data authentication input being a signature drawn by a user of the first computing device or other biometric measurement of the user of the first computing device; extracting, with the first computing device, from a plurality of different portions of the unstructured-data authentication input, a plurality of features exhibited by respective portions of the unstructured-data authentication input, the extracted features forming a structured-data representation of the authentication input; determining, with the first computing device, a first instance of a value that deterministically varies between authentication attempts; and determining, with the first computing device, an first encrypted value based on both the structured-data representation of the authentication input and the first instance of the value that deterministically varies; and sending, with the first computing device, the first encrypted value to a second computing device, wherein the first encrypted value is sufficient to authenticate the user based on the signature or other biometric measurement without sending a reusable copy of the signature or other biometric measurement during authentication.

Some aspects include a process comprising: obtaining, with one or more processors, a repository of user authentication records, each record having a user identifier and set of features detected in a biometric measurement of a respective corresponding user; receiving, with one or more processors, a first encrypted value sent by a remote computing device and an identifier of a user to be authenticated based on the encrypted value; retrieving, with one or more processors, from the repository, a user authentication record corresponding to the identifier of the user to be authenticated; determining, with one or more processors, a second encrypted value based on the set of detected features in the retrieved authentication record, the set of features being obtained before receiving the first encrypted value; determining, with one or more processors, that the first encrypted value matches the second encrypted value; and based on the determination, with one or more processors, sending a message over a network indicating that the user is authenticated.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
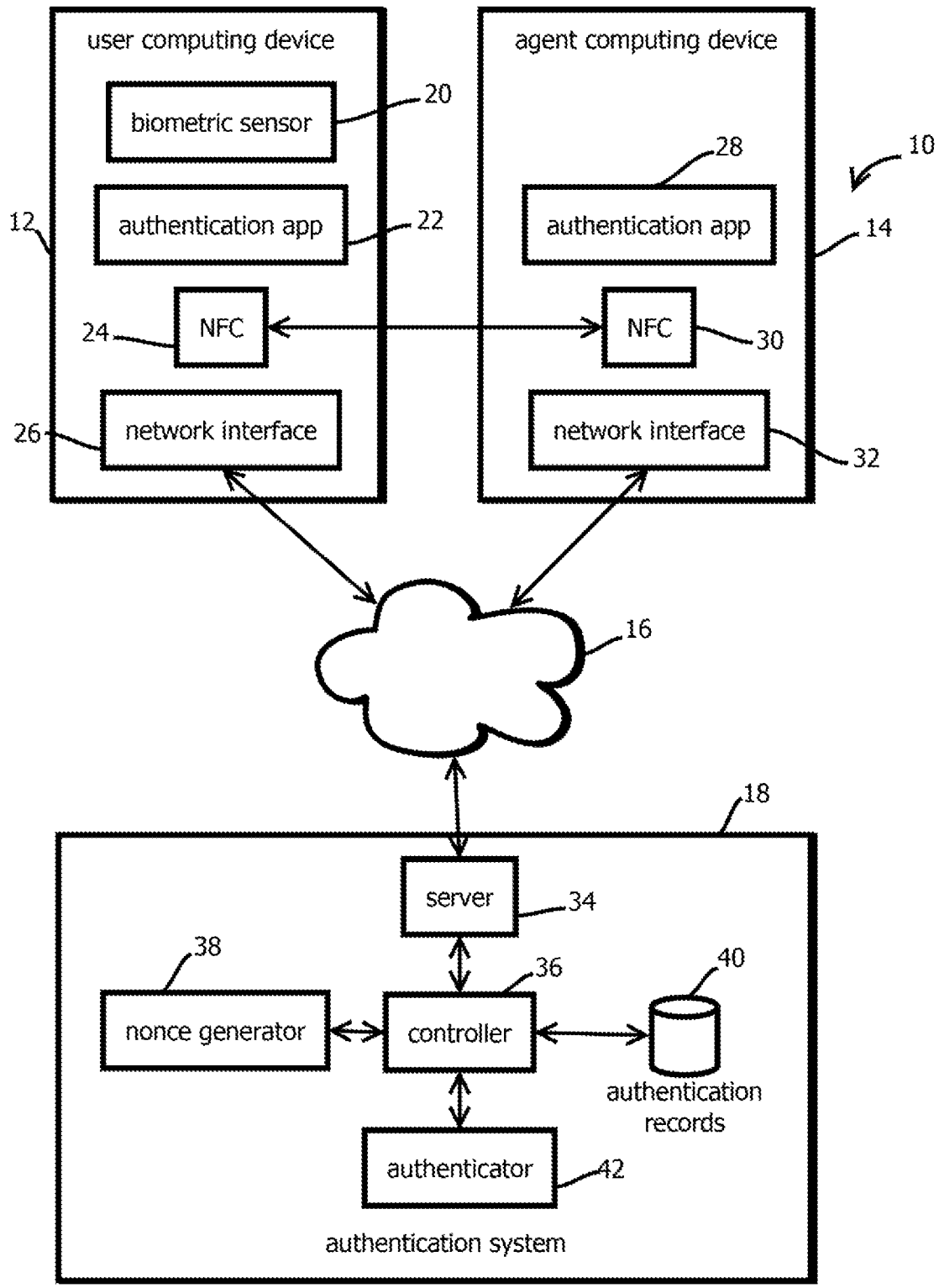
FIG. 1 illustrates an authentication system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, in computing systems, often users are authenticated based on user inputs, like a password. Certain types of inputs are often more convenient than others. For example, passwords can be inconvenient because users often find passwords difficult to remember, particularly when they have multiple passwords for multiple sites that change over time. Dedicated electronic devices for authentication, like dongles that generate single-use codes, are often unwieldy and inconvenient for users to carry. (None of which is to suggest that any of these mechanisms are disclaimed or may not be used in accordance with some embodiments, e.g., as a factor in a multi-factor authentication protocol.) Many of these issues are mitigated by biometric measurement of the user. The user always has their own body present, and the user does not need to remember information to generate a biometric measurement. Often, the measurements are unique to the individual and have a relatively high information entropy (e.g., more than 30 bits), making them difficult to impersonate. Examples are described below and include things like the user's signature, fingerprint, iris patterns, gait, typing cadence, facial attributes, and the like.

One challenge with use of biometric measurements for authentication in computing systems is that once compromised, it is generally difficult for the user to change the biometric attributes measured. For example, if a malicious party captures a biometric measurement, for instance, in transit during an authentication attempt, or at rest in an authentication system's memory, that malicious party may attack the authentication system by impersonating the user with copies of the measurement later. Often, the user is left with few remedies, as it can be difficult to change the biometric measurement that the user can generate to replace the maliciously copied measurements used by an adversary. Thus, the convenience of biometric measurements for authentication are often unrealized due to security concerns.

Some embodiments may mitigate these issues by constraining which information about the biometric measurements is sent to the authentication system and protecting that information with encryption. Further, some embodiments may implement these techniques in a way that is relatively robust to measurement variation, for instance, changes in a user's signature, noisy signals from fingerprint readers or iris scans, or variation in pose or lighting in facial recognition scans. In some cases, the full biometric measurement may be captured by a computing device possessed by the user or other trusted party, and features of the biometric measurement may be extracted by that computing device, without the raw measured data leaving that device. Those extracted features, or a selected subset, may be encrypted and sent to an authentication system over a network, in some embodiments, and the authentication system may compare the received encrypted data to a version of the encrypted data re-created by the authentication system based on previously supplied biometric measurements of the user. In some cases, the encrypted data includes both the biometric measurement and a value that varies between authentication attempts (e.g., deterministically, such that it is known to both the sender and receiver), so that repeated transmissions of multiple instances of the biometric measurement do not produce the same encrypted value, and captured instances of the encrypted value cannot be reused by an adversary.

As a result, some embodiments may protect the user's biometric measurements from interception by an adversary, as captured data is not expected to be amenable to reuse by the adversary to later impersonate the user. Further, different features may be selected from a biometric measurement to determine the encrypted value if, for some reason, some of the features become known to an adversary, thereby allowing a single biometric measurement to be reused for authentication after certain types of data breaches. That said, various independently useful techniques are described with different engineering and cost trade-offs, and some embodiments may only use a subset of these techniques. So it should be emphasized that embodiments are not limited to those that afford every advantage described herein in combination.

FIG. 1 shows an example of a computing environment 10 having an authentication system 18 consistent with the above approach. In some embodiments, computing devices within the environment 10 may implement client-side processes described below with reference to FIG. 2 and server-side processes described below with reference to FIG. 3 in order to authenticate users with biometric measurements while mitigating some of the above-described issues. In some embodiments, these computing environments and processes may be implemented with a plurality of the computing devices described below with reference to FIG. 4, for instance, in the form of rack-mounted servers in a data center, mobile computing devices, wearable computing devices, desktop computing devices, and laptop computing devices, depending upon role and implementation. In some embodiments, instructions that effectuate the described functionality may be stored on a tangible, non-transitory, computer readable medium, such that when the instructions are executed by one or more processors, the functionality described is effectuated. In some embodiments, the medium may be distributed, for instance with different subsets of the instructions stored in memory of different computing devices that execute those different subsets, in some cases in cooperation to effectuate a distributed system consistent with that described. Distributed media consistent with this approach are also referred to with the singular term "medium" herein.

In some embodiments, the computing environment 10 includes a user computing device 12, an agent computing device 14, the Internet 16, and an authentication system 18. In some embodiments, user computing device 12 and agent computing device 14 may be mobile computing devices, such as wearable computing devices, tablet computers, laptop computers, in-dash automotive computers, or the like that are physically near one another, for instance, within wireless range of a local wireless area network, a personal area network, or the like, for instance within 50 meters of one another. In some cases, the agent computing device 14 is carried by an employee or contractor of an entity operating the authentication system 18 or that of a company that uses the authentication system 18 (for instance, with a plurality of other companies in a software-as-a-service arrangement) to authenticate users engaging with its agents. In one example scenario, the agent computing device 10 is that of a delivery person, like a tablet or laptop or mobile device (such as a cell phone) carried by the delivery person when visiting a residence or workplace of a user receiving a delivery, and the user computing device 12 is one of these types of mobile computing devices in the possession of a user receiving the delivery (or other service).

It should be emphasized, though, that the present techniques are useful in a wide variety of scenarios, including scenarios in which the agent computing device 14 is an embedded system, for instance, associated with and controlling an electronic lock by which a user is granted access to a physical space or physical control of an apparatus, or scenarios in which the user computing devices used to authenticate the user to an application executing on the user computing device or on a third party Web server or other server accessible via the Internet 16. In some cases, the authentication system 18 is remote from the computing devices 12 and 14 and services a relatively large number of concurrent sessions in which authentication determinations are made, for instance, servicing more than 1,000 authentication attempts per minute or more than 10,000 authentication attempts per minute. In some cases, only a subset of received credentials are authenticated, e.g., after delivery, in the event that a user contents that delivery was made.

In some embodiments, the user computing device 12 includes a biometric sensor 20, an authentication application 22, a near field communication radio 24, and a wireless network interface 26. In some embodiments, the authentication application 22 is downloaded and installed on the user computing device 12, for instance, from an application store server hosted by an entity that provides an operating system of the user computing device. In some embodiments, the authentication application 22 execute the routine described below with reference to FIG. 2 during an authentication session in which the user is authenticated, a user's authentication credentials are captured and stored for later in case needed, or authentication is denied.

In some embodiments, the biometric sensor 20 includes one or more of a variety of different types of sensors by which biometric information is obtained from the user. In some cases, the biometric sensor 20 is a touch screen of the user computing device upon which the user draws a signature. In other embodiments, the touchscreen is a force-sensitive touchscreen that captures both position coordinates on a touchscreen of user contact and a measurement of an amount of force (for instance, with four or more different levels of force) applied at the coordinates along with a timestamp of when the force was applied, for instance, in a timeseries recording of the signature.

In some embodiments, a user signature may be measured with other techniques, for instance, the user may draw the signature on some other surface in view of a camera of the user computing device, and the camera may record video of the signature being drawn, or the user computing device may capture the signature being drawn in open space with video captured with a time-of-flight sensor or other depth sensor that senses the position of the user's hand in space as the user draws a signature.

In some cases, the biometric sensor 20 captures a video of the user's face when uttering a particular phrase, such as an event that occurred prominently in the news within some trailing duration of time, along with the associated audio, and the uttered phrase may converted to text and used to determine whether a query against a search engine for the uttered phrase returns a new story within a threshold rank having less than a threshold age. In other embodiments, the biometric sensor may be a fingerprint sensor, an iris scanner, an accelerometer from which the user's gait is measured or with which the user's movements when drawing their signature in space by moving the phone with their arm is captured. In some cases, the biometric sensor 20 is a combination of these sensors.

In some cases, the near field communication radio 24 may have a range of less than 3 meters, for instance less than 30 centimeters, and maybe configured to communicate with a similar radio on the agent computing device 14 is described below. In some cases, the near field communication interface may facilitate relatively secure exchanges of data with a limited range by allowing the user to selectively grant wireless access by controlling the devices allowed physical proximity to their computing device 12. In other embodiments, other types of radios may be used, including Bluetooth™ and Wi-Fi™ radios, and in some cases, the functionality attributable to the near field communication radio 24 may be implemented by the network interface 26.

In some embodiments, the network interface 26 is a Wi-Fi™ network interface or a cellular network interface by which the user computing device 12 communicates with the Internet 16.

In some embodiments, the agent computing device 14 includes an instance of the authentication application 28 configured for the agent's role, for instance, that of a delivery person, an embedded system controlling a lock, a door-person granting access to a physical space, a kiosk in a store by which the user obtains goods or services, or the like. In some embodiments, the agent's computing device 14 further includes a near field communication radio 30 and a network interface 32 like those described above.

In some cases, the various computing devices communicate with one another via the Internet 16, for instance, via the Internet 16 and various other networks, such as cellular networks, wireless local area networks, and data center networks.

In some embodiments, the authentication system 18 includes a collection of remotely operated servers, for instance, in a data center and configured to communicate with one another. In some embodiments, the authentication system 18 includes a Web server 34 or an API server, a controller 36, a nonce generator 38, an authentication record repository 40, and an authenticator 42. In some cases, the controller 36 may coordinate the operation of these components and execute a routine described below with reference to FIG. 3.

In some embodiments, the server 34 communicates with the authentication applications 22 and 28. In some cases, the server 34 is a nonblocking server operative to communicate with a relatively large number of computing devices in a relatively large number of concurrent authentication sessions by handing off substantive actions in the sessions to different instances of the controller 36 executing concurrently.

In some embodiments, the nonce generator 38 is configured to generate a value that varies, e.g., deterministically, between authentication attempts. Examples include a linear shift register, the current time, the current date, or the like. In some embodiments, the nonce generator 38 is configured to generate a value that varies non-deterministically, such as a random string used as salt and an encrypted value described below. In some cases, the nonce generator 38 obtains the value from another computing device, for instance, in the form of a public key of the user computing device. In some embodiments, the authentication application 22 may include a similar or identical instance of the nonce generator 38 for generating (e.g., calculating or otherwise obtaining) the same value during an authentication session.

In some embodiments, the authentication record repository 40 is a relational or non-relational database having a plurality of authentication records. In some cases, each record may be indexed by a user identifier, for instance, one sent with an authentication request along with an encrypted value by which authentication determinations are made, such that corresponding authentication records may be retrieved upon receiving such a request based on the user identifier. In some cases, the authentication records are sorted by a user identifier to facilitate relatively fast retrieval of authentication records, for instance, with a binary search, or some embodiments may arrange the authentication records in a hash table having a hash key based on the user identifier, such that authentication records may be retrieved relatively quickly without needing to iterate through every authentication record to identify a specific one. Or some embodiments may iterate through every authentication record to simplify operations at the expense of higher latency.

In some embodiments, each authentication record includes a structured data representation of a biometric measurement previously supplied by the user. In some cases, the structured data representation includes an ordered list of features extracted from the biometric measurement, for instance, during an application set up process initiated after installation, and sent by the user computing device 12. Examples of such features are described below with reference to FIGS. 2 and 3. In some embodiments, biometric measurements may be relatively noisy and subject to variation between instances. Accordingly, some embodiments may store in each authentication record a description of a statistical distribution of features of biometric measurements of a given user. For instance, a plurality of samples of a biometric measurements, like three or more five or more or twenty or more, may be captured, and features may be extracted and stored in the authentication record to provide a plurality of samples indicative of statistical distributions of features extracted from biometric measurements previously supplied.

In some embodiments, the authenticator 42 may receive encrypted values during an authentication request, for instance, directly from the user computing device 12, or sent by the user computing device 12 to the agent computing device 14 and relayed from the agent computing device 14 to the authentication system 18. In some embodiments, as described below, the authenticator 42 may receive these encrypted values (which may not be described by the agent computing device 14) and identify a corresponding authentication record from the authentication record repository 40 based on a user identifier accompanying the encrypted value. In some cases, with the stored record, some embodiments may re-create a current nonce with the nonce generator 38, such as a value that varies deterministically or non-deterministically, append that value to a set of extracting features from previous biometric measurements in the authentication record, and attempt to re-create the received encrypted value. Or some embodiments may parse the value that varies from the received message, leaving a value based on the extracted features to match based on stored records of biometric features.

If the biometric measurement supplied by the user results in features being extracted that are the same as those extracted from previous biometric measurements, then the resulting re-created encrypted value is expected to match that supplied in the authentication request. In this case, the authenticator 42 may cause a signal to be sent indicating the user is authenticated.

In some embodiments, statistical variation in extracted features (e.g., due to variations in a person's signature over time) may be accommodated by calculating a plurality of different attempts to re-create the received encrypted value based on different sets of extracted features from different biometric measurements in the retrieved authentication record. Some embodiments may determine whether a threshold amount, such as more than one, more than two, or more than three of the re-created encrypted values match the received encrypted value to determine whether the user is authenticated. In some cases, a plurality of encrypted values may be received based on different subsets of features extracted from the biometric measurement, and some embodiments may attempt to re-create these received encrypted values based on different subsets of extracted features in the authentication record from previous biometric measurements, again to accommodate some amount of noise in the biometric measurement where some portions of the biometric measurement are inconsistent across attempts and others are not. Some embodiments may determine whether more than a threshold amount of the re-created encrypted values match at least one of those that are received. In some cases, the subset may be more than 20% of the extracted features, more than 50%, or more than 80% of the extracted features, and the threshold may be more than two, more than three, or more than five or some other value.

In response to determining that the authentication system 18 is able to re-create the encrypted value based on the previously stored features of previous biometric measurements, in some embodiments, the authentication system 18 may send a signal to the agent computing device 14 indicating that the user is authenticated or to some other computing device that grants access to the user to some physical or virtual resource or service. Alternatively, in response to determining that the authentication system 18 is unable to re-create the received encrypted value based on the previously stored features of previous biometric measurements, in some embodiments, the authentication system may send a signal to this device indicating that the user is not authenticated. Some embodiments may maintain a variable in memory or in storage indicating an amount of authentication attempts or timestamped log instances of authentication attempts, and some embodiments may block future authentication attempts in response to determining that more than a threshold amount of failed attempts have occurred, such as greater than a threshold number within a trailing duration of time.

Thus, some embodiments may authenticate the user (or capture sufficient to do so later if needed) without exposing the user's biometric measurement to the agent computing device 14 or intercepting parties with access to the communications via the Internet 16.

Figure 2:
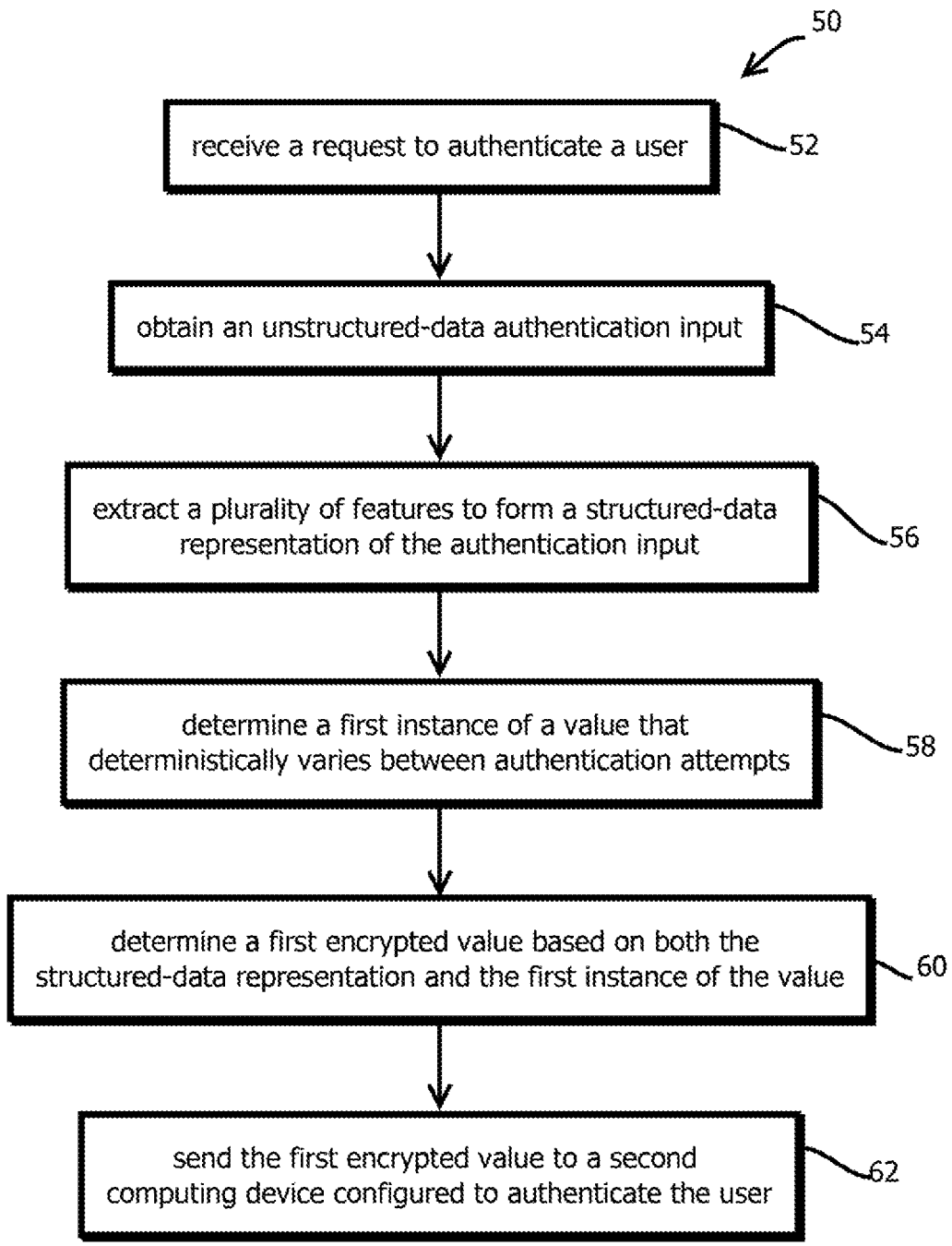
FIG. 2 illustrates a credential submission process in accordance with some embodiments.

FIG. 2 shows an example of a process 50 that may be executed by the authentication application 22 on the user computing device 12 described above with reference to FIG. 1. In some cases, the process may be initiated upon receiving a request to authenticate a user, as indicated by block 52. In some cases, the request may be received via a near field communication directly between the agent computing device 14 and the user computing device 12. For instance, the user computing device 12 may execute a background process with an event handler that subscribes to operating system events indicative of a near field communication request identifying the application, and that event handler may initiate the process 50. For instance, a delivery person operating the agent computing device 14 may input a command indicating that they intend to deliver a package, and the application 28 may send the near field communication request to authenticate the user before authorizing delivery.

Next, some embodiments may obtain an unstructured-data authentication input 54. In some cases, the unstructured-data authentication input is a biometric measurement, like those described above. The unstructured-data is a typically noisy representation of a signal provided by the user, for instance a biometric phenomenon measured. Examples of unstructured data include digital photographs, video, signatures, fingerprint scans, iris scans, and the like. In these examples, multiple measurements of the same feature can produce representations that vary between samples, for instance, due to changes in lighting, variation in how a user draws their signature, different sensor position, and the like. In contrast, text passwords are structured data, as the representation is without noise and does not vary between instances of the representation being input by a user who should be authenticated.

Next, some embodiments may extract a plurality of features to form a structured-data representation of the authentication input, as indicated by block 56. In some embodiments, the structured-data representation may still be subject to noise but may be substantially lower in dimension than the unstructured data representation. For example, video of a user's face may have several hundred thousand or million dimensions, while a set of extracted features may have less than 1,000 and in many cases less than 100. In some embodiments, the structured data representation may be less than 1% of the dimensionality of the unstructured data authentication input.

In some embodiments, feature extraction may include extracting features from a signature. Examples include parsing an image to identify individual letters of the signature and then extracting features of those letters, for example, a number of strokes, an aspect ratio, a speed with which the letter is drawn, a range of force on a given stroke, a gradient of force on a given stroke, a number of lines in a letter, a number of curves in a letter, a radius of the curve, a height of a letter, a width of a letter and ratios therebetween. Or in some cases, such features may be extracted from collections of letters or the entire signature. Or using similar techniques, such features may be extracted from a pattern from a fingerprint, iris scan, gait, typing cadence, and the like. In some embodiments, features may be extracted from a face in a video of the user, such as positions between eyes, ratio of nose to mouth, cheekbone positions, and the like, for instance obtained with image processing techniques. In some cases, the structured data representation may be characterized as a vector or other ordered list of classified or otherwise quantized aspects of the biometric measurement.

For example, features may be extracted from a fingerprint with the techniques described in Rajanna et al., A comparative study on feature extraction for fingerprint classification and performance improvements using rank-level fusion, Pattern Anal. Applic., published online 28 Apr. 2009, the contents of which are hereby incorporated by reference.

Features may be extracted from a fingerprint with the techniques described in Narkhede et al., Review of Feature Extraction Techniques for Offline Signature Verification, International Journal of Engineering Research and Technology, V. 3, issue 2, 27 Feb. 2014, the contents of which are hereby incorporated by reference.

Features may be extracted from an iris scan with the techniques described in Bhattacharyya, et al., IRIS Texture Analysis and Feature Extraction for Biometric Pattern Recognition, International Journal of Database Theory and Application, vol. 1, pp. 7, the contents of which are hereby incorporated by reference.

Features may be extracted from an image of a face with the techniques described in Rahib H. Abiyev, FACIAL FEATURE EXTRACTION TECHNIQUES FOR FACE RECOGNITION, Journal of Computer Science 10 (12): 2360-2365, 2014, the contents of which are hereby incorporated by reference.

Next, some embodiments may determine a first instance of a value that deterministically (or otherwise) varies between authentication attempts, as indicated by block 58. In some cases, this may be determined with the techniques described above with reference to the nonce generator 38. Or some embodiments may determine a value that varies non-deterministically, such as a random value.

Next, some embodiments may determine a first encrypted value based on both the structured-data representation and the first instance of the value that varies deterministically, as indicated by block 60. To this end, some embodiments may append each of the extracted features (e.g., measured attributes of the biometric measurement in the form of text) and the varying value to form a single string, and that string may be input into a cryptographic hash function, such as MD5 or SHA256, which may output an encrypted value based on both of these types of inputs. The varying value is expected to make it relatively unlikely that the same biometric measurement yields the same encrypted value during different authentication attempts, thereby making it difficult to capture an encrypted value during transmission and reuse that encrypted value to later impersonate the user.

As noted above, biometric measurements are often noisy, which can impede authentication through false rejections (i.e., declining to authenticate a user who should be authenticated). A variety of techniques may be used to tune the system the balance between false rejections and false acceptances (i.e., authenticating a user who should not be authenticated). For example, some embodiments may select different subsets of the extracted features, for instance, 20 different random samplings or predetermined selections among a set of 30 extracted features, and each selected subset may be combined with the nonce value to calculate 20 different encrypted values. This set of encrypted values may be sent as described below to provide a plurality of different ways to match to the biometric measurement in case different aspects of the biometric measurement are particularly noisy. The size of the subset relative to the total set and number of encrypted values may be tuned to balance between the risk false rejections and false acceptances, with larger subsets and fewer encrypted values generally being more secure by presenting a greater risk of false rejections on authentication.

Next, some embodiments may send the first encrypted value to a second computing device configured to authenticate the user, as indicated by block 62. In some cases, the encrypted value may be sent via the agent computing device 14 described above, first through NFC communication between the two computing devices 12 and 14, and then via the agent computing device 14 and the Internet 16, to the authentication system 18. As a result, some but embodiments may effectuate authentication even if the user computing device 12 is without Internet access, thereby providing a relatively reliable delivery scenario. As noted, in some cases, a plurality of encrypted values may be sent in cases in which different subsets of the extracted features are sampled.

Figure 3:
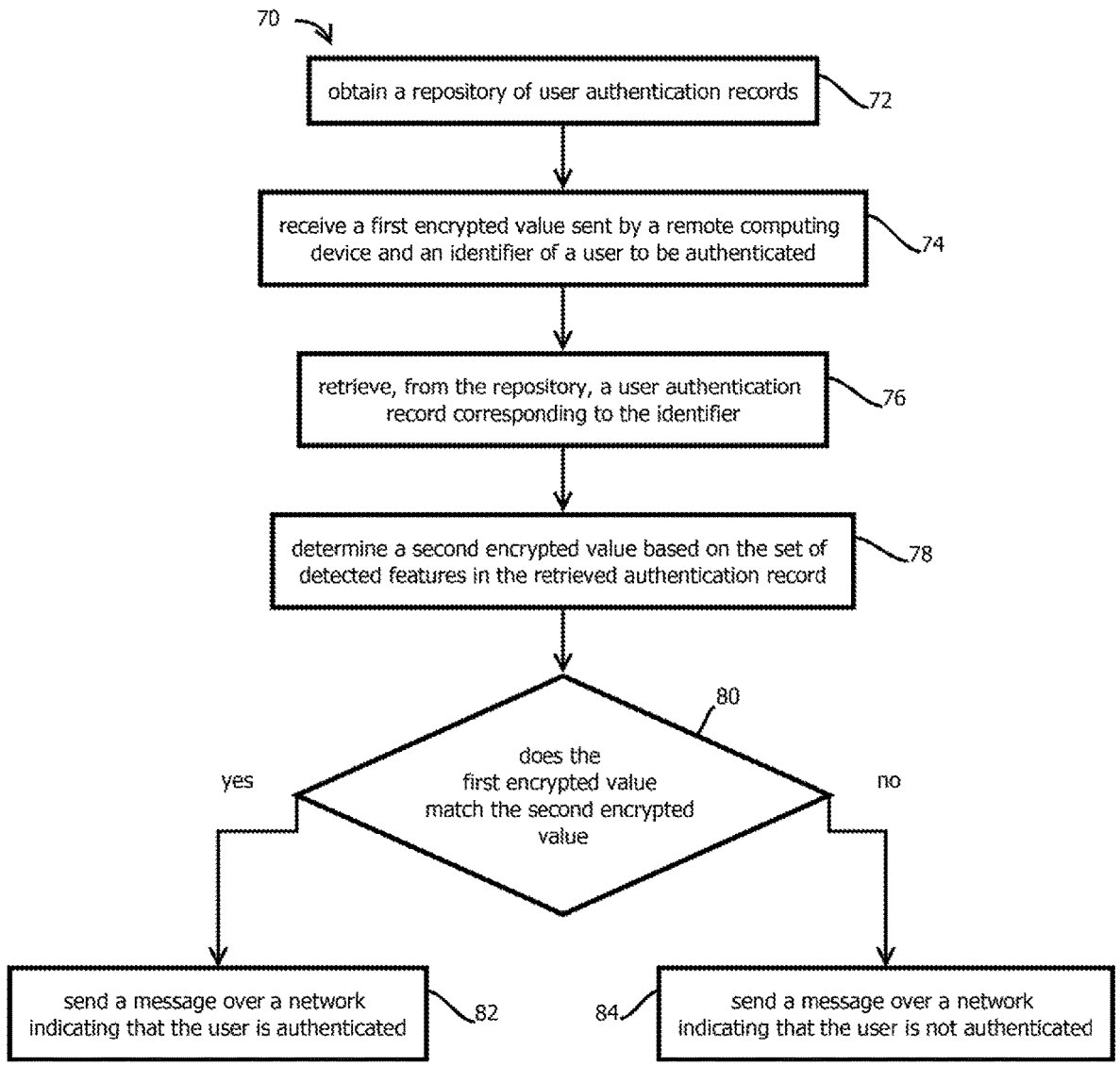
FIG. 3 illustrates a credential authentication processes in accordance with some embodiments.

FIG. 3 shows an example of a process 70 that may be executed by the authentication system 18 of FIG. 1 in order to authenticate a user. Some embodiments include obtaining a repository of user authentication records, as indicated by block 72. In some cases, each time a user downloads and installs the authentication application described above, the user may be automatically instructed via a user interface to supply one or more biometric measurements via their computing device. In some embodiments, the client-side application receiving those measurements may execute the techniques described above to extract features from those measurements. The client-side application may send those measurements to the authentication system 18 to populate a new record for the user along with the user's identifier. In some cases, the repository may include more than 10 million records, and some embodiments may implement the techniques described above to facilitate relatively fast retrieval from the repository.

Next, some embodiments may receive a first encrypted value sent by a remote computing device and an identifier of a user to be authenticated, as indicated by block 74. In some cases, this information may be received via the agent computing device 14 described above, or in some cases from some other computing device, or directly from the user computing device 12 described above. In some cases, this communication may initiate an authentication session in which it is determined whether the user can be authenticated. In some cases, the encrypted value is received via multiple layers of encryption, e.g., TLS encryption may be applied to network traffic, and once TLS decryption is performed, the value may still be encrypted with a lower-level layer of encryption, e.g., with the above described cryptographic hash function.

Next, some embodiments may retrieve from the repository a user authentication record corresponding to the identifier, as indicated by block 76. In some cases, the authentication record may include features extracted from a plurality of biometric measurements, and in some cases, each biometric measurement may include a plurality of features, for instance, in the range of 20 to 200 values that vary over ranges having between 2 and 20 increments. Some embodiments may quantize the extracted features into bins, which may be more likely to be repeatable across measurements (e.g., rounding a letter higher in a signature to the nearest millimeter).

Next, some embodiments may determine a second encrypted value based on the set of detected features in the retrieved authentication record, as indicated by block 78. In some cases, this may include generating another instance of the deterministically varying value or otherwise obtaining a copy of the value that varies and was used by the user's computing device to generate the encrypted value.

In some cases, the identical routine used to generate the first encrypted value may be performed by the authentication system based on extracted features in the retrieved authentication record from previous biometric measurements. In some cases, a plurality of encrypted values may be generated to accommodate noise in measurements, for instance, a plurality of encrypted values based on different ones of biometric measurements previously supplied, a plurality of encrypted values based on different subsets of features of a given biometric measurement previously supplied, or a combination thereof. Some embodiments may determine between 5 and 50 encrypted values, in some cases, each using the same varying value and different subsets of extracted features or sets of extracted features from previous biometric measurements.

Next, some embodiments may determine whether the first encrypted value matches the second encrypted value, as indicated by block 80. In some cases, this includes determining whether the received first encrypted value is an exact match to the second encrypted value. Some embodiments may determine whether more than a threshold amount of a plurality of received encrypted values are exact matches to at least one of a plurality of encrypted values determined in block 78. In some cases, information upon which the encrypted value is based is compared to determine the match of block 80. For instance, some embodiments may directly compare sent features revealed by decrypting a transmitted encrypted value to records of features stored in memory.

In response to an affirmative determination of block 80, some embodiments may send a message over a network indicating that the user is authenticated, as indicated by block 82. In some cases, this message may be sent to the agent computing device 14 described above, to some other computing device, or to the user computing device.

Alternatively, in response to a negative determination of block 80, some embodiments may send a message to that computing device indicating that the user is not authenticated, as indicated by block 84.

In some embodiments, the varying value may be determined by the authentication system 18 independently of the determination of a varying value by the user computing device 12, though both may arrive at the same value. In some embodiments, the varying value obtained by the authentication system 18 is determined by a device other than the user computing device 12.

In some cases, certain subsets of features of a user's biometric measurement may be held in reserve and not provided to the authentication system 18 to provide a fallback position for continuing to use the biometric measurement even after a data breach. For example, some embodiments may only send 10% of extracted features to populate authentication records and only use that 10% when determining an encrypted value during an authentication attempt. Upon a data breach, some embodiments may send an instruction to the user computing device to select a different sampling of the extracted features and send that different sampling to the authentication system 18 to create a new authentication record that is immune to impersonation attempts based on breached data.

Some embodiments may train a multilayer neural net on a plurality of samples of the biometric measurement. Some such embodiments may have a plurality of hidden layers split between computing devices, placing those layers closer to the input on the client-device and the other layers in the authentication system. The outputs of the client-side portion of the model may be output in encrypted form, sent over the Internet 16, and received and decrypted by the authentication system 18 before being input to the other portion of the model. In some cases, to facilitate relatively fast training and avoid delays from network communications, the full model may be trained on one computing device, e.g., the user computing device or authentication system 18 before being split. In some cases, the model may be trained with a gradient descent on a labeled training set including tagged instances of biometric measurements from the user and from random sampling of biometric measurements others have supplied and agreed to have used for model training, providing both true and false outputs that are labeled in the set. Some embodiments may randomly assign weights to the model, and then iteratively adjust weights in a direction that a partial derivative of an error function relative to the training set indicate will reduce the aggregate error, until a termination condition occurs, e.g., less than a threshold amount of change in weights or a threshold number of iterations.

Figure 4:
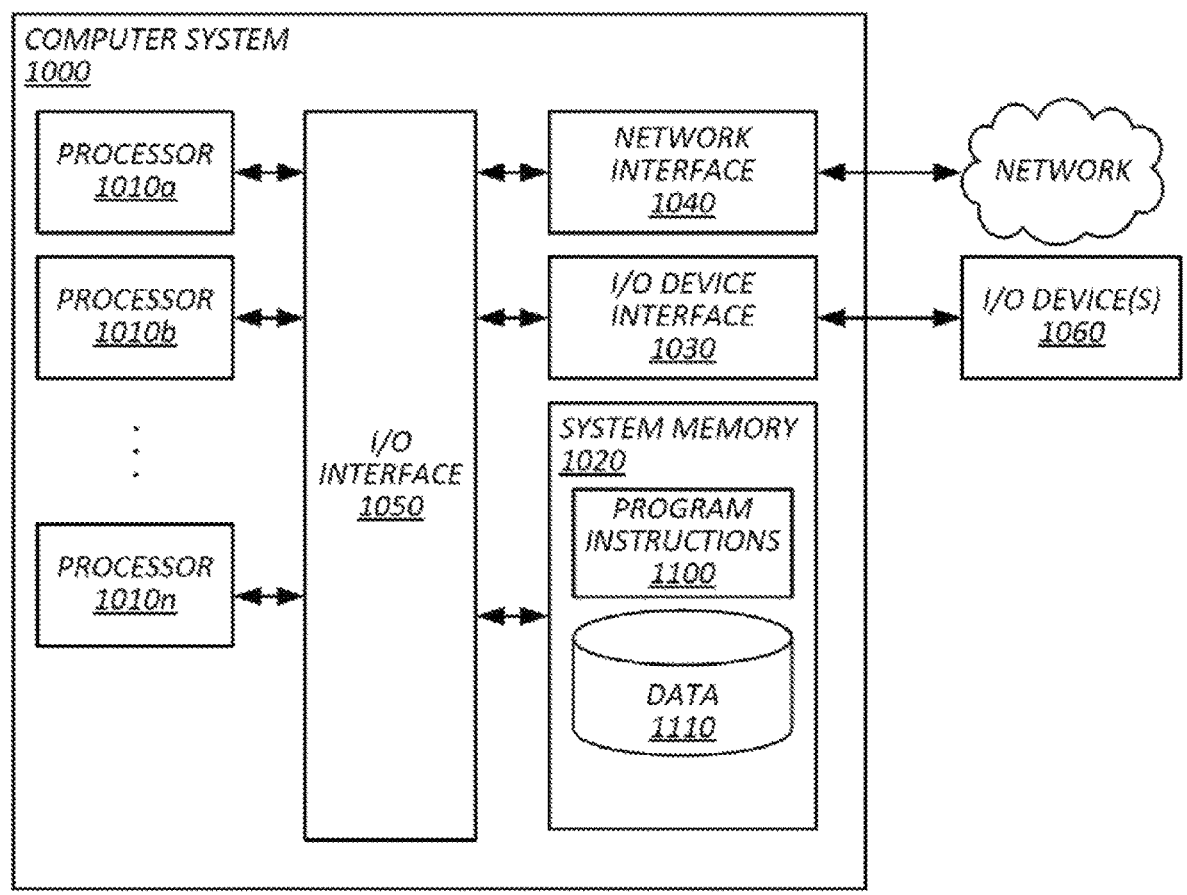
FIG. 4 illustrates an example of a computer system by which the above processes and systems may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more computing devices effectuate operations, comprising: receiving, with a first computing device, a request to authenticate a user of the first computing device; obtaining, with the first computing device, an unstructured-data authentication input, the unstructured-data authentication input being a signature drawn by a user of the first computing device or other biometric measurement of the user of the first computing device; extracting, with the first computing device, from a plurality of different portions of the unstructured-data authentication input, a plurality of features exhibited by respective portions of the unstructured-data authentication input, the extracted features forming a structured-data representation of the authentication input; determining, with the first computing device, a first instance of a value that deterministically varies between authentication attempts; and determining, with the first computing device, an first encrypted value based on both the structured-data representation of the authentication input and the first instance of the value that deterministically varies; and sending, with the first computing device, the first encrypted value to a second computing device, wherein the first encrypted value is sufficient to authenticate the user based on the signature or other biometric measurement without sending a reusable copy of the signature or other biometric measurement during authentication.

2. The medium of embodiment 1, wherein: the second computing device is configured to authenticate the user; the unstructured data input is a signature drawn by the user of the first computing device on a touchscreen of the first computing device or sensed by a camera or depth sensor of the first computing device; extracting comprises segmenting the signature by letter or word and detecting a plurality of features of each of a plurality of letters or words, the detected features of at least some letters or words including a value indicative of a radius of curvature of a stroke in a letter or word, a value indicative of an aspect ratio of at least part of a letter or word, a value indicative of a number of strokes with which a letter or word is formed in the signature; the structured-data representation comprises an ordered list of extracted features encoded in text form; the value that varies deterministically is based on a current time; determining the encrypted value comprises calculating a hash value with a cryptographic hash function based on a string formed by appending the value that varies deterministically and values indicative of each of the extracted features; sending the encrypted value comprises: sending the encrypted value with near-field communication to a third computing device that sends the encrypted value to the second computing device, wherein, before sending the encrypted value, the second computing device stores a structured-data representation of the user's signature that the second computing device combines with a second instance of the value that deterministically in a second encrypted value to be compared with the first encrypted value in order to authenticate the user.

3. The medium of any one of embodiments 1-2, the operations comprising: before receiving the request to authenticate the user, providing to a data repository accessible to the second computing device, a previous structured-data representation of a previous a signature drawn by a user of the first computing device or other biometric measurement of the user of the first computing device, the previous structured-data representation having extracted features of the previous signature or biometric measurement, wherein: a user identifier of the user is associated with the first encrypted value by the first computing device in one or more communications by which the first encrypted value is sent, and the previous structured-data representation accessed responsive to a query including the user identifier.

4. The medium of any one of embodiments 1-3, the operations comprising: receiving, with the second computing device, the encrypted value; obtaining, with the second computing device, in unencrypted form, a second instance of the value that deterministically varies; accessing, with the second computing device, a previous structured-data representation based on the user identifier, the previous structured-data representation having features extracted from a previous signature or biometric measurement of the user; determining, with the second computing device, a second encrypted value based on both the second instance of the value that deterministically varies and at least some of the previous structured-data representation; and comparing, with a computing device other than the first computing device, the second encrypted value and the first encrypted value to authenticate the user.

5. The medium of embodiment 4, wherein: the second instance of the deterministically varying value is not determined by the first computing device and is determined independently from the determination of the first instance of the value by the first computing device.

6. The medium of embodiment 4, the operations comprising: providing to the data repository a plurality of instances previous structured-data representations of a plurality of previous signatures or other biometric measurements of the user, the plurality of instances of previous structured-data representations characterizing a statistical distribution of variation in extracted features of signatures or other biometric measurements of the user.

7. The medium of embodiment 6, the operations comprising: authenticating the user by determining a plurality of encrypted values and comparing the plurality of encrypted values to the first encrypted value to determine that at least one of the plurality of encrypted values match the first encrypted value, wherein ones of the plurality of encrypted values are each based on a different one of the plurality of instances of previous structured-data representations.

8. The medium of any one of embodiments 1-7, the operations comprising: determining, with the first computing device, a plurality of encrypted values based on a plurality of different permutations of subsets of the extracted features, the plurality of encrypted values including the first encrypted value; and sending the plurality of encrypted values to the second computing device, the second computing device being configured to determine whether at least a threshold amount of the plurality encrypted values match other encrypted values based on one or more previous signatures or other biometric measurements obtained from the user.

9. The medium of any one of embodiments 1-8, wherein: determining the first encrypted value comprises steps for determining a hash value based on the structured-data representation and the first instance of the value that deterministically varies.

10. The medium of any one of embodiments 1-9, wherein: the request to authenticate is received via a wireless transmission from a third computing device directly to the first computing device; and the first encrypted value is sent to the second computing device via the third computing device before the second computing device causes an indication to be sent to the third computing device that the user is authenticated.

11. The medium of any one of embodiments 1-10, wherein: classifying comprises classifying based on time-stamped measurements indicative of location and amount of force applied at the respective location during signing.

12. The medium of any one of embodiments 1-11, wherein extracting features comprises: extracting from an obtained signature two or more items from the following list: a slope of a line; a radius of curvature; an aspect ratio of a letter or letters; or a number of strokes.

13. The medium of any one of embodiments 1-12, wherein determining that the first encrypted value is sufficient to authenticate the user comprises: steps for authenticating a user.

14. The medium of any one of embodiments 1-13, the operations comprising, responsive to authentication: sending a message authorization provision of goods or services to the user; granting access to a computer application or data; or sending a message that causes an actuator to unlock a lock.

15. A method, comprising: obtaining, with one or more processors, a repository of user authentication records, each record having a user identifier and set of features detected in a biometric measurement of a respective corresponding user; receiving, with one or more processors, a first encrypted value sent by a remote computing device and an identifier of a user to be authenticated based on the encrypted value; retrieving, with one or more processors, from the repository, a user authentication record corresponding to the identifier of the user to be authenticated; determining, with one or more processors, a second encrypted value based on the set of detected features in the retrieved authentication record, the set of features being obtained before receiving the first encrypted value; determining, with one or more processors, that the first encrypted value matches the second encrypted value; and based on the determination, with one or more processors, sending a message over a network indicating that the user is authenticated.

16. The method of embodiment 15, comprising: receiving a third encrypted value and an identifier of the user; determining that the third encrypted value does not correspond to the set of features detected in the biometric measurement in the retrieved authentication record and, in response, sending another message over a network indicating a failed authentication attempt.

17. The method of any one of embodiments 15-16, comprising: determining a plurality of encrypted values based on: different respective subsets of the set of features detected in the biometric measurement in the retrieved authentication record; different respective sets of features detected in different respective biometric measurements in the retrieved authentication record; or a combination thereof; and determining that more than a threshold amount, the threshold having a value greater than two, of the different encrypted values match the first encrypted value.

18. The method of any one of embodiments 15-17, wherein determining the second encrypted value comprises: obtaining a value that varies between at least some authentication attempts; and hashing a combination of the value and at least some of the set of features detected in the signature or other biometric measurement in the retrieved authentication record to produce a hash value.

19. The method of any one of embodiments 15-18, wherein the detected features are obtained from a remote computing device that receives the biometric measurement and detects the features before sending the detected features to a computing device with access to the repository without sending the biometric measurement itself.

20. The method of any one of embodiments 15-19, comprising: receiving the first encrypted value from a mobile computing device, the first encrypted value being based on a signature drawn on a touchscreen of the mobile computing device or a fingerprint sensed with the mobile computing device; and sending the message indicating that the user is authenticated to a different computing device from the mobile computing device.

21. A method, comprising: the operations of any one of embodiments 1-14.

22. A system, comprising: one or more processors; and memory storing instructions that when executed by the processors cause the processors to effectuate operations comprising: the operations of any one of embodiments 1-20.

What is claimed is:

1. A method, comprising:
   obtaining, with one or more processors, a repository of user authentication records, each record having a user identifier and set of features detected in a biometric measurement of a respective corresponding user;
   receiving, with one or more processors, from a remote computing device, a first encrypted value and an identifier of a user to be authenticated based on the first encrypted value;
   retrieving, with one or more processors, from the repository, a user authentication record corresponding to the received identifier of the user to be authenticated;
   determining, with one or more processors, a second encrypted value based on the set of detected features in the retrieved authentication record, the set of detected features being obtained before receiving the first encrypted value;
   determining, with one or more processors, that the first encrypted value matches the second encrypted value; and
   based on the determination that the first encrypted value matches the second encrypted value, sending, with one or more processors, a message over a network indicating that the user is authenticated, wherein the detected features in the retrieved authentication record are obtained from the remote computing device that receives the biometric measurement and detects the features before sending the detected features to a computing device with access to the repository without sending the biometric measurement itself.

2. The method of claim 1, further comprising:
   receiving a third encrypted value and an identifier of the user;
   determining that the third encrypted value does not correspond to a fourth encrypted value based on the set of features detected in the biometric measurement in the retrieved authentication record and, in response, sending another message over a network indicating a failed authentication attempt.

3. The method of claim 1, further comprising:
   determining a plurality of encrypted values based on:
   different respective subsets of the set of features detected in the biometric measurement in the retrieved authentication record,
   different respective sets of features detected in different respective biometric measurements in the retrieved authentication record, or
   a combination thereof; and
   determining that more than a threshold amount, the threshold having a value greater than two, of the plurality of encrypted values match the first encrypted value.

4. The method of claim 1, wherein determining the second encrypted value comprises:
   obtaining a value that varies between at least some authentication attempts; and
   hashing a combination of the value that varies and at least some of the set of features detected in a signature or other biometric measurement in the retrieved authentication record to produce a hash value.

5. The method of claim 1, further comprising
   receiving the first encrypted value from a mobile computing device, the first encrypted value being based on a signature drawn on a touchscreen of the mobile computing device or a fingerprint sensed with the mobile computing device.

6. The method of claim 5, further comprising sending the message indicating the user is authenticated to a different computing device from the mobile computing device.

7. The method of claim 1, further comprising, in response to the user being authenticated, sending a message authorizing provision of goods or services to the user.

8. The method of claim 1, further comprising, in response to the user being authenticated, granting access to a computer application or data.

9. The method of claim 1, further comprising, in response to the user being authenticated, sending a message that causes an actuator to unlock a lock.

10. A method, comprising:
    obtaining, with one or more processors, a repository of user authentication records, each record having a user identifier and set of features detected in a biometric measurement of a respective corresponding user;
    receiving, with one or more processors, from a remote computing device, a first encrypted value and an identifier of a user to be authenticated based on the first encrypted value;
    retrieving, with one or more processors, from the repository, a user authentication record corresponding to the received identifier of the user to be authenticated;
    determining, with one or more processors, a plurality of encrypted values based on:
    (1) different respective subsets of the set of features detected in the biometric measurement in the retrieved authentication record, the set of features being obtained before receiving the first encrypted value,
    (2) different respective sets of features detected in different respective biometric measurements in the retrieved authentication record, the set of features being obtained before receiving the first encrypted value, or
    (3) a combination thereof;
    determining, with one or more processors, that more than a threshold amount, the threshold having a value greater than two, of the plurality of encrypted values match the first encrypted value; and
    based on the determining, sending, with one or more processors, a message over a network indicating that the user is authenticated.

11. The method of claim 10, wherein the detected features in the retrieved authentication record are obtained from the remote computing device that receives the biometric measurement and detects the features before sending the detected features to a computing device with access to the repository without sending the biometric measurement itself.

12. The method of claim 10, wherein determining the second encrypted value comprises:
    obtaining a value that varies between at least some authentication attempts; and
    hashing a combination of the value that varies and at least some of the set of features detected in a signature or other biometric measurement in the retrieved authentication record to produce a hash value.

13. The method of claim 10, further comprising receiving the first encrypted value from a mobile computing device, the first encrypted value being based on a signature drawn on a touchscreen of the mobile computing device or a fingerprint sensed with the mobile computing device.

14. The method of claim 13, further comprising sending the message indicating the user is authenticated to a different computing device from the mobile computing device.

15. The method of claim 10, further comprising, in response to the user being authenticated, sending a message authorizing provision of goods or services to the user.

16. The method of claim 10, further comprising, in response to the user being authenticated, granting access to a computer application or data.

17. The method of claim 10, further comprising, in response to the user being authenticated, sending a message that causes an actuator to unlock a lock.

18. A method, comprising:
  obtaining, with one or more processors, a repository of user authentication records, each record having a user identifier and set of features detected in a biometric measurement of a respective corresponding user;
  receiving, with one or more processors, from a remote computing device, a first encrypted value and an identifier of a user to be authenticated based on the first encrypted value;
  retrieving, with one or more processors, from the repository, a user authentication record corresponding to the received identifier of the user to be authenticated;
  determining, with one or more processors, a second encrypted value based on the set of detected features in the retrieved authentication record, the set of detected features being obtained before receiving the first encrypted value;
  determining, with one or more processors, that the first encrypted value matches the second encrypted value; and
  based on the determination that the first encrypted value matches the second encrypted value, sending, with one or more processors, a message over a network indicating that the user is authenticated, wherein determining the second encrypted value comprises: obtaining a value that varies between at least some authentication attempts; and hashing a combination of the value that varies and at least some of the set of features detected in a signature or other biometric measurement in the retrieved authentication record to produce a hash value.

19. The method of claim 18, wherein the detected features in the retrieved authentication record are obtained from the remote computing device that receives the biometric measurement and detects the features before sending the detected features to a computing device with access to the repository without sending the biometric measurement itself.

* * * * *